Nov. 10, 1953  F. CUNNINGHAM, JR  2,659,079
MOVING TARGET RADAR SYSTEM
Filed Dec. 10, 1945

INVENTOR
FREDERIC CUNNINGHAM JR.
BY
William D. Hall.
ATTORNEY

UNITED STATES PATENT OFFICE 2,659,079

MOVING TARGET RADAR SYSTEM

Frederic Cunningham, Jr., Belmar, N. J., assignor to the United States of America as represented by the Secretary of War Application December 10, 1945, Serial No. 634,078

7 Claims. (Cl. 343—7.7)

The present invention relates to a radio object locating system which is adapted to distinguish fixed objects from moving objects, and it relates more particularly to a moving object selector which forms a component of such a system.

A radio object locating system which is adapted to distinguish fixed objects from moving objects, and which presents on an indicator, signals representing moving objects only, is referred to as a moving target indication (MTI) system. In an MTI system, exploratory pulses of radiant energy are transmitted in the usual manner, and in addition reference oscillations having a fixed phase with respect to each transmitted exploratory pulse are provided at the receiver. Object returned echo pulses are combined with the reference oscillations and the two combine to a degree depending upon their relative phase. Echo pulses from stationary objects have a constant phase with respect to the reference oscillations, whereas echo pulses from moving objects have a continuously varying phase. The combined echo pulses and reference oscillations are detected to provide video pulses, and video pulses representing moving objects have a cyclical variation in amplitude whereas video pulses representing stationary objects have a substantially non-varying amplitude.

The rate of phase change and hence the rate of video pulse amplitude variation is directly proportional to the radial velocity of the reflecting object. Thus the frequency of the modulation envelope of a plurality of video pulses is directly proportional to the radial velocity of the detected object.

An MTI system makes use of this difference in pulse to pulse amplitude to provide an indication of moving objects only. This is accomplished by means of a moving object selector. The basic principle of any moving object selector is to compare successive video pulses and to provide pulse signals whose amplitude is substantially proportional to the difference in amplitude between successive video pulses. Thus, as pulses representing stationary objects are non-varying, no output signals will be obtained therefore from the moving object selector, whereas a residual output pulse signal will be obtained for signals representing moving objects.

There are two major ways of comparing successive pulses. One is to use a delay type transmission line (or delay line as it is usually called) which is adapted to delay signals of electrical energy for a predetermined period of time and wherein a portion of each video pulse signal is delayed for a period of time substantially equal to the interval between successive pulses. The delayed pulse signal is then compared with a second and undelayed portion of each video pulse signal in order to obtain an output pulse signal whose amplitude is substantially proportional to the difference in amplitude between successive video pulse signals. Comparison is achieved by phase inverting either the delayed pulse or the undelayed pulse and algebraically combining the delayed and undelayed signals to obtain a residual signal. It is thus evident that if successive pulse signals have the same amplitude (hence represent stationary objects) there is no residual pulse signal provided as an output from the moving object selector.

The other major method of a pulse comparison is to use a storage tube. Basically, such a tube consists of a glass envelope containing a storage plate element, a load impedance connected thereto, and means for generating an electron beam which bombards said storage plate element. Video signals to be stored are used to modulate the electron beam and a signal is developed across the output load impedance, said signal being substantially proportional to the difference in amplitude between successive video pulses. A moving object selector employing such a storage tube is more fully described in a copending application of Alfred G. Emslie, entitled "Moving Object Detection System," Serial No. 594,266, filed May 17, 1945, and issued June 20, 1950, as Patent No. 2,512,144.

One difficulty in using storage tubes is that the storage plate element often charges quite slowly when the electron beam scans rapidly and thus the charge does not readily follow small changes in signal amplitude, thus resulting in poor signal discrimination. Poor discrimination also results if the directional beam of exploratory radiant energy scans too rapidly. Under such circumstances the echo pulses from stationary objects vary in amplitude and have the appearance of moving object echoes. In both delay line and storage tube type moving object selectors, difficulty is encountered when signals are received from two different reflecting sources where one reflecting source is moving at but a slightly different rate than the other. In such an instance the discrimination is poor as it is difficult to distinguish one group of signals from the other.

It is an object of the present invention to provide a moving object selector which makes an MTI system more effective in distinguishing between signals from aircraft and those from other moving objects.

It is another object of the present invention to provide a storage tube type of moving object selector which reduces the poor discrimination due to rapid scanning of the beam of radiant energy.

It is still another object of the present invention to provide a moving object selector which provides an improved discrimination between signals from objects having slightly different radial velocities.

The invention, however, will be more fully understood from the following detailed description when taken into consideration with the accompanying drawing wherein.

Figure 1:
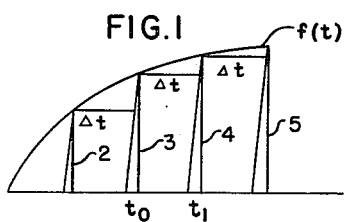
Fig. 1 is a schematic diagram of successive echo pulses and which serves to give a better understanding of the principles of the present invention.

An understanding of the basic principles of the present invention may be obtained by reference to Fig. 1. In the figure, 2, 3, 4 and 5 represent successive pulses whose modulation envelope is $E=f(t)$. Assume that pulse 3 occurs at a time equal $t_0$ and that pulse 4 occurs at a time $t_1$ and further assume that pulse 3 is to be compared with pulse 4 in a moving object selector and that a signal proportional to the amplitude difference between pulse 4 and pulse 3 will be obtained. Then the amplitude of pulse 3 may be represented as $E_0=f(t_0)$. But as the interval between successive pulses may be represented as $\Delta t$, $E_1$ may be written as $E_1=f(t_0+\Delta t)$.

Attention is directed to the fact that if a delay line type moving object selector is used $\Delta t$ is substantially equal to the amount of delay introduced by the delay line.

The difference in amplitude $\Delta E$ between pulses 3 and 4 is then $$\Delta E = E_1 - E_0 = f(t_0+\Delta t) - f(t_0)$$

then $$\frac{\Delta E}{\Delta t} = \frac{f(t_0+\Delta t) - f(t_0)}{\Delta t}$$

and $$\underset{\Delta t \to 0}{\text{Limit}} \frac{\Delta E}{\Delta t} = \frac{dE}{dt} = \underset{\Delta t \to 0}{\text{Limit}} \frac{f(t_0+\Delta t) - f(t_0)}{\Delta t} = f'(t)$$

where $f'(t)$ is equal to the first derivative of $f(t)$. Thus, if $\Delta t$ is sufficiently small, the modulation envelope of a plurality of pulses forming the output of a moving object selector is substantially proportional to the first derivative of the envelope of a plurality of pulses applied to said selector.

In view of the foregoing, it is evident that if successive pulses are compared, and a residual pulse is obtained proportional to the difference in amplitude between successive pulses, and that if the interval between successive pulses is relatively small compared to a complete cycle of the modulation envelope, the modulation envelope of the residual pulses is to a close approximation proportional to the first derivative of the envelope of the original pulses. Thus, the envelope of the signals obtained from a moving object selector whether it be either of the delay line type or the storage tube type is substantially proportional to the first derivative of the original pulse modulation envelope. If the output of the moving object selector is then applied to a second moving object selector and the process repeated, the signals obtained as an output from said second selector will have a modulation envelope proportional to the second derivative of the modulation envelope of the pulses applied to the first moving object selector.

In a moving target indication system, the modulation envelope of the video pulses obtained by combining the echo pulses with reference oscillations is substantially sinusoidal. Thus, the modulation envelope $f(t)$ may be written as $$f(t) = E_0 \sin \omega t$$

where $\omega$ is proportional to the frequency of the modulation envelope of a plurality of video pulses. Then $$\frac{dE}{dt} = E_0 \omega \cos \omega t$$

and as the modulation envelope of the pulse signals obtained at the output of the first moving object selector is proportional to $$\frac{dE}{dt}$$

it can be seen that the peak amplitude of the modulation envelope varies with $\omega$. If the pulse signals which are obtained at the output of the first moving object selector are then applied to a second moving object selector, the second moving object selector will provide signals having a modulation envelope whose peak amplitude is substantially proportional to the derivative of the modulation envelope of the input pulses applied thereto, and hence proportional to the second derivative of the modulation envelope of the input pulses applied to the first moving object selector.

This second derivative with respect to $t$ is $$\frac{d^2E}{dt^2} = -E_0 \omega^2 \sin \omega t$$

This represents the modulation envelope of a plurality of pulse signals where said modulation envelope has a peak amplitude which varies with the square of $\omega$. It is thus evident that the output from the second moving object selector gives a higher order of discrimination with respect to $\omega$ than does the output from the first moving object selector.

This improved discrimination is shown graphically in Figs. 2a, 2b, and 2c wherein the ordinate in each instance represents the peak amplitude (i. e. response) of a modulation envelope of a plurality of pulses, and the abscissa represents the radial velocity. It will be recalled that the radial velocity is proportional to $\omega$, where $\omega$ is equal to $2\pi$ times the frequency of the modulation envelope of the video pulses applied to the first moving object selector. Fig. 2a represents the response characteristic at the input to the first moving object selector, and merely means that although the frequency of the modulation envelope of the video pulses varies with $\omega$, the peak amplitude of the modulation envelope remains constant for all values of $\omega$ and hence constant for all radial velocities. For example, at $\omega_1$, the peak amplitude of the modulation envelope is equal to the peak amplitude of the modulation envelope at $\omega_2$. The peak amplitude only, and not the sinusoidal variations of the envelope are shown in the figure.

Fig. 2b represents the response characteristic at the output of a first moving object selector. This figure indicates that the peak amplitude of the modulation envelope of a plurality of pulses which form the output from said moving object selector varies linearly with $\omega$. By way of example, if the frequency of the modulation envelope of the input pulses to the moving object selector is proportional to $\omega_1$, then the peak amplitude of the output pulse modulation envelope is represented by the ordinate 10. If, however, the frequency of the modulation envelope of the input pulses to the moving object selector is proportional to $\omega_2$, the peak amplitude of the output pulse modulation envelope is represented by the ordinate 12.

Figure 2:
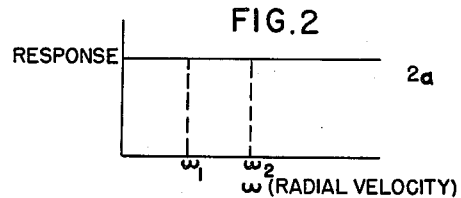
Fig. 2 is a series of graphs which enable a better understanding of the present invention.

Fig. 2c represents response characteristics at the output of the second moving object selector. This figure shows the same information as did the graphs of Figs. 2a and 2b. However, in this instance, the response curve varies as the square of $\omega$ and hence is a graph obtained by squaring the ordinates of Fig. 2b. Attention is directed to the fact that the ordinates in each of the graphs of Fig. 2 are not to the same scale. It is evident by examination of Fig. 2c that for equal changes in radial velocity (i. e. $\omega$) there is a greater change in the peak amplitude of the modulation envelope of pulses forming an output for the second moving object selector than there is where only one moving object selector is used.

Consider a specific example. Assume that the radio object locating system is employed to detect moving vehicles and that in addition to signals being received from the moving vehicles, additional signals from other moving objects such as trees swaying in the wind, etc., are also received. Then the video signals representing the trees, etc., hereinafter referred to as ground clutter may have a modulation frequency proportional to $\omega_1$, whereas the moving vehicles may be represented by video pulses having a modulation envelope proportional to $\omega_2$. If these signals are then applied to just one moving object selector, said moving object selector will provide as an output, pulses representing said ground clutter, said pulses having a peak amplitude proportional to ordinate 10 of Fig. 2b. The same moving object selector will provide output pulses representing the moving vehicles and having a peak amplitude proportional to ordinate 12 of Fig. 2b. As there is relatively little difference between the peak amplitude of the signals representing the moving vehicles and those representing the ground clutter, it may be rather difficult to distinguish between signals representing one and signals representing the other.

If however, the pulse signals from the first moving object selector are applied to a second moving object selector, then the discrimination is improved appreciably. For example, the signals representing the ground clutter may have a peak amplitude proportional to ordinate 15 of Fig. 2c and the peak amplitude of the signals representing the moving vehicles may be proportional to the ordinate 16 of Fig. 2c. It is quite evident that it is now much easier to discriminate between two groups of signals having only slightly different modulation frequencies. This becomes especially clear when it is realized that the ordinates in Fig. 2c are drawn to a much smaller scale than are the ordinates of Fig. 2b.

Figure 3:
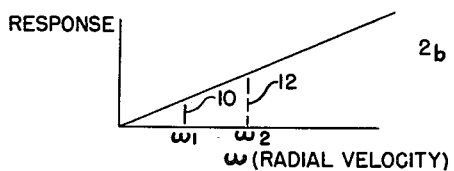
Fig. 3 is a block diagram of one embodiment of the present invention employing a delay line type moving object selector.
Figure 3:
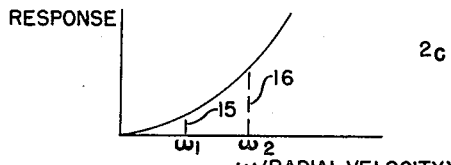
Figure 3:
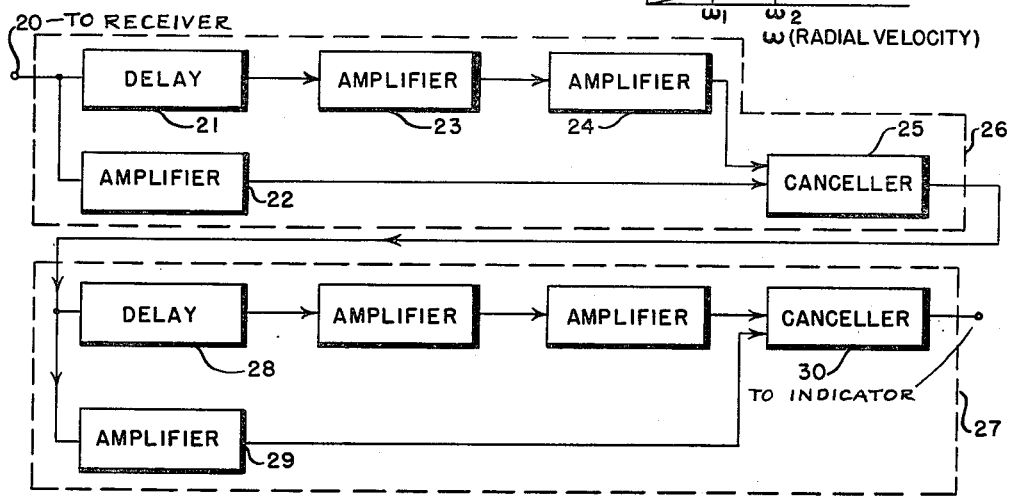

Reference is made to Fig. 3 which shows one embodiment of the present invention employed in an MTI radio object locating system. Video pulses manifesting moving objects having a cyclical variation in amplitude and video pulses manifesting fixed objects having a substantially non-varying amplitude are applied to input terminal 20. Video pulses are applied simultaneously to delay line 21 and to amplifier 22. Delay line 21 may consist of a delay type transmission line of the character described in a copending application of Gordon Donald Forbes and Herbert Shapiro entitled "Transmission Line," Serial No. 608,310, filed August 1, 1945, Patent No. 2,423,306.

The delay incurred by signals passing through delay line 21 is substantially equal to the interval between the video pulses applied thereto. The output of said delay line is then fed to amplifier 23 and the output therefrom is in turn applied to amplifier 24. The output issuing from output amplifier 24 is then of opposite polarity from the output issuing from the amplifier 22. The gain of amplifier stages 23 and 24 is adjusted so that if non-varying amplitude signals are applied to input terminal 20, the output from amplifier 24 will be of equal amplitude and opposite polarity to signals issuing from amplifier 22. The output from amplifier 24 and the output from amplifier 22 are then simultaneously applied to canceller 25. As the signals applied thereto are of equal and opposite polarity, canceller 25 functions to provide a residual pulse substantially proportional to the difference in amplitude of the two inputs. Thus, if video signals applied to input terminal 20 are non-varying in amplitude, the two inputs to canceller 25 cancel one another and there is no output therefrom. On the other hand, if the amplitude of the pulses to input terminal 20 vary from pulse to pulse, a residual signal will be obtained from canceller 25 substantially proportional to the difference in amplitude between successive pulses. The circuit which is described may be referred to as moving object selector 26. It is to be understood that there are other ways of inverting one of the pulses to be compared, for example, the pulses applied to canceller 25 may be of the same polarity and they may be inverted therein by any well known means.

The second moving object selector 27 which is identical to moving object selector 26 may be connected in series therewith. The output from canceller 25 of moving object selector 26 is then applied simultaneously to delay line 28 and amplifier 29 of moving object selector 27. The output from canceller 30 of moving object selector 27 then consists of video pulses having an amplitude which is always substantially proportional to the difference in amplitude of successive video pulses issuing from moving object selector 26. The output from canceller 30 of moving object selector 27 may then be applied to a suitable indicator such as a cathode ray tube. Because of the action of the serially connected moving object selectors (as heretofore fully described), the discrimination is greatly improved and the modulation envelope of the peak amplitudes of video pulses issuing from moving object selector 27 varies substantially as the second derivative of the modulation envelope of the video pulses applied to input terminal 20.

Figure 4:
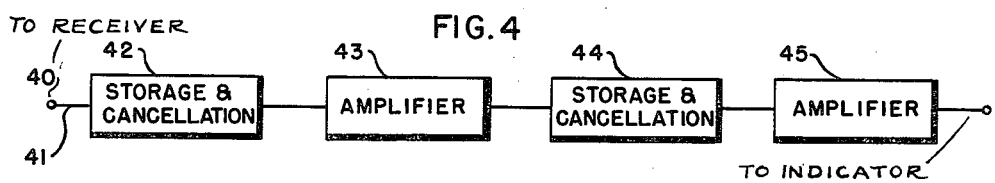
Fig. 4 is a block diagram of one embodiment of the present invention employing a storage tube type moving object selector.

Fig. 4 is a second embodiment of the present invention which performs a function similar to the embodiment of Fig. 3 but which employs moving object selectors using a storage tube instead of a delay line. As heretofore described, video pulses may be applied to a storage tube and an output may be obtained therefrom substantially proportional to the difference in amplitude between successive stored video pulses.

Signals of the same character as those applied to input terminal 20 of Fig. 3 are applied to input terminal 40 of Fig. 4. These signals are in turn applied by means of connection 41 to a storage and cancellation circuit 42. Storage and cancellation circuit 42 comprises a storage tube of the character described and hence provides as an output therefrom video pulses having an amplitude substantially proportional to the difference in amplitude of successive pulses applied to input terminal 40. These signals are then fed to amplifier 43 and the amplified output therefrom is fed to a second moving object selector comprising a storage and cancellation circuit 44 which is identical in function to storage and cancellation circuit 42. The output pulses from storage and cancellation circuit 44 are then fed to and amplified by amplifier 45 and the output therefrom may be applied to an indicator.

As in the instance of the embodiment of Fig. 3, the modulation envelope of the output signals issuing from the second moving object selector is substantially proportional to the second derivative of the modulation envelope of the video pulses applied to input terminal 40.

Although there has been shown a first embodiment using two delay line type moving object selectors and a second embodiment using two storage tube type moving object selectors, it will be apparent to one skilled in the art that there may be combinations thereof. For example, signals may be applied to a delay line type moving object selector and the output therefrom then applied to a storage tube type or vice versa.

Another advantage of using two serially connected moving object selectors is evident when it is realized that the actual signal perceived on an indicator is proportional to the product of the amplitude of the received signal and the ordinate of the response curve. By reference to Fig. 2, it can be seen that at low velocities (in the region of $\omega=0$) the ordinate of the response curve shown in Fig. 2c is appreciably smaller than the ordinate of the response curve shown in Fig. 2b. Thus, as signals representing ground clutter have a low modulation frequency (i. e. $\omega$ nearly equal to zero), it is apparent that the product of the ordinate of the response curve and the ground clutter signal is much smaller when two moving object selectors are used than when only one is used. Thus, if two serially connected moving object selectors are used, the response to ground clutter which generally has a large amplitude but a low velocity ($\omega$ is small) is small and the ground clutter appears as a relatively low amplitude signal on the indicator as compared to signals representing moving objects.

Although there has been here described one embodiment of the present invention, it will be manifest to those skilled in the art that other changes and modifications may be made therein. It is therefore aimed in the appended claims to cover all such modifications as fall within the spirit and scope of the invention.

What is claimed is:

1. In a radio object locating system which transmits exploratory pulses of radiant energy and which distinguishes between fixed objects and moving objects by the character of the video pulses obtained from received echo pulses, and wherein fixed objects are evidenced by video pulses having a substantially non-varying amplitude and moving objects are evidenced by pulses having a cyclical variation in amplitude, a first means for selecting pulses from moving objects, said means including a delay type transmission line means for delaying signals of electrical energy for a period of time substantially equal to the interval between exploratory pulses, means for applying a first portion of each video pulse to said delay line, means for algebraically combining the output of said delay line with a second undelayed portion of each of said video pulses to obtain as an output from said first means pulse signals whose amplitude is substantially proportional to the difference in amplitude between successive video pulses, a second means for selecting pulses from moving objects similar to said first means including a second delay type transmission line, means for applying a first portion of each pulse signal which forms the output from said first means as an input to said second delay line, means for algebraically combining the output of said second delay line with a second undelayed portion of the input to said second means to obtain as an output from said second means pulse signals.

2. In a radio object locating system which transmits exploratory pulses of radiant energy and which distinguishes between fixed objects and moving objects by the character of the video pulses obtained from received echo pulses, and wherein fixed objects are evidenced by video pulses having a substantially non-varying amplitude and moving objects are evidenced by pulses having a cyclical variation in amplitude, a first means responsive to the difference in amplitude of successive pulses applied thereto for selecting pulses from moving objects, means for applying said video pulses thereto to obtain as an output therefrom, pulse signals whose amplitude is substantially proportional to the difference in amplitude between successive video pulses, a second means responsive to the difference in amplitude of successive pulses applied thereto for selecting pulses from moving objects, and means for applying the output of said first means thereto to obtain pulse signals whose amplitude is substantially proportional to the difference in amplitude betwen successive output pulse signals from said first means, whereby the peak amplitude of the modulation envelope of a plurality of pulse signals from said second means is substantially proportional to the second derivative of the modulation envelope of the plurality of video pulses applied to said first means.

3. In a radio object locating system which transmits exploratory pulses of radiant energy and which distinguishes between fixed objects and moving objects by the character of the video pulses obtained from received echo pulses, and wherein fixed objects are evidenced by video pulses having a substantially non-varying amplitude and moving objects are evidenced by pulses having a cyclical variation in amplitude, a first means responsive to the difference in amplitude of successive pulses applied thereto for selecting pulses from moving objects including a storage tube, means for applying said video pulses to said storage tube for deriving output signal pulses therefrom having an amplitude substantially proportional to the difference in amplitude between successive video pulses, a second means responsive to the difference in amplitude of successive pulses applied thereto for selecting pulses from moving objects including a second storage tube similar to said first storage tube, means for applying the output signals from said first storage tube as an input to said second storage tube and for deriving second output pulse signals therefrom whose amplitude is substantially proportional to the difference in amplitude between successive input pulses to said second means.

4. In a radio object locating system which transmits exploratory pulses of radiant energy and which distinguishes between fixed objects and moving objects by the character of the video pulses obtained from received echo pulses, and wherein fixed objects are evidenced by video pulses having a substantially non-varying amplitude and moving objects are evidenced by pulses having a cyclical variation in amplitude, a plurality of means responsive to the difference in amplitude of successive pulses applied thereto for selecting pulses from moving objects connected in cascade, means for applying said video pulses to the first of said cascade connected selecting means, and means for deriving output pulse signals from the last of said cascade connected selecting means in response to those video pulses having a cyclical variation in amplitude.

5. In a radio object locating system which transmits periodic exploratory pulses of radiant energy and which distinguishes between fixed objects and moving objects by the character of the echo signals obtained from the received echo pulses, and wherein fixed objects are evidenced by echo signals having a substantially uniform amplitude and moving objects are evidenced by echo signals having a cyclical variation in amplitude, a first means responsive to the difference in amplitude of successive pulses applied thereto for selecting pulses from moving objects, means for applying said echo signals to said selecting means for deriving output signals therefrom only in response to successive echo signals of different amplitudes from a given object, a second means responsive to the difference in amplitude of successive pulses applied thereto for selecting pulses from moving objects, and means for applying the output signals of said first selecting means to said second selecting means for deriving output signals therefrom only in response to successive output signals of different amplitudes from said given object.

6. The apparatus defined in claim 5 wherein said first and second selecting means each includes a cathode ray storage tube.

7. The apparatus defined in claim 5 wherein each of said first and second selecting means includes means for delaying said echo signals for a time equal to the period between successive exploratory pulses, and means for combining each delayed echo signal with a succeeding undelayed echo signal from the same object to obtain a signal in response to the difference in amplitudes between said delayed and undelayed signals.

FREDERIC CUNNINGHAM, Jr.

References Cited in the file of this patent

UNITED STATES PATENTS

| Number | Name | Date |
|---|---|---|
| 2,266,401 | Reeves | Dec. 16, 1941 |
| 2,410,424 | Brown | Nov. 5, 1946 |
| 2,412,669 | Bedford | Dec. 7, 1946 |
| 2,412,974 | Deloraine | Dec. 24, 1946 |
| 2,422,135 | Sanders | June 10, 1947 |
| 2,437,173 | Rutherford | Mar. 2, 1948 |
| 2,440,301 | Sharpe | Apr. 27, 1948 |
| 2,532,546 | Forbes | Dec. 5, 1950 |

FOREIGN PATENTS

| Number | Country | Date |
|---|---|---|
| 528,192 | Great Britain | Oct. 24, 1940 |
| 552,072 | Great Britain | Mar. 22, 1943 |